Dec. 18, 1934.   G. WISTRAND   1,984,718
METHOD OF ELIMINATING ECCENTRICITY IN THE ROTATION
OF WORK SPINDLES FOR MACHINE TOOLS
Filed April 12, 1933   2 Sheets-Sheet 2
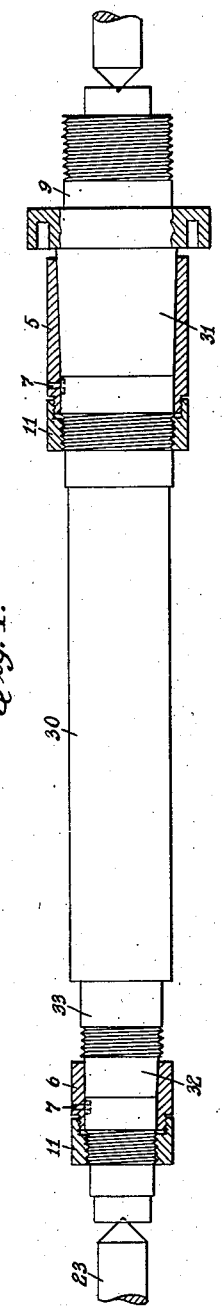
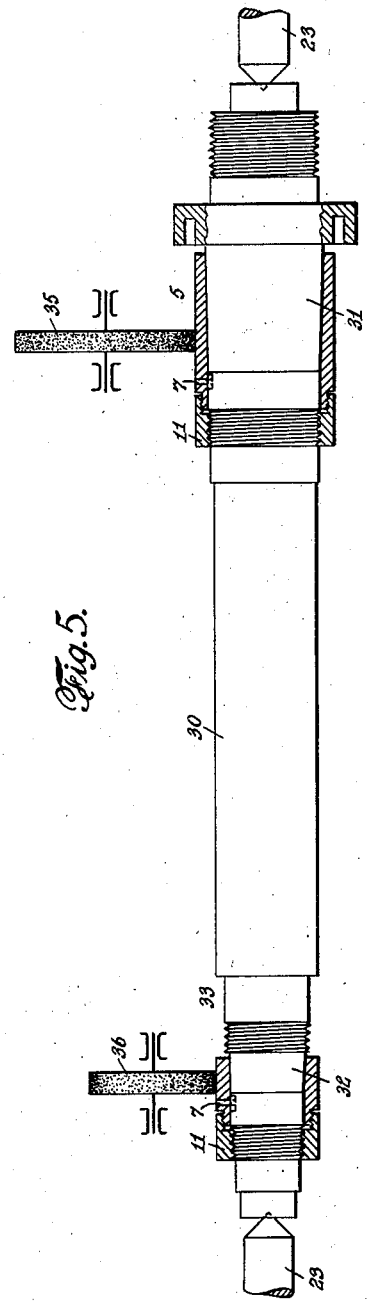
INVENTOR
GUNNAR WISTRAND
BY
ATTORNEY Patented Dec. 18, 1934

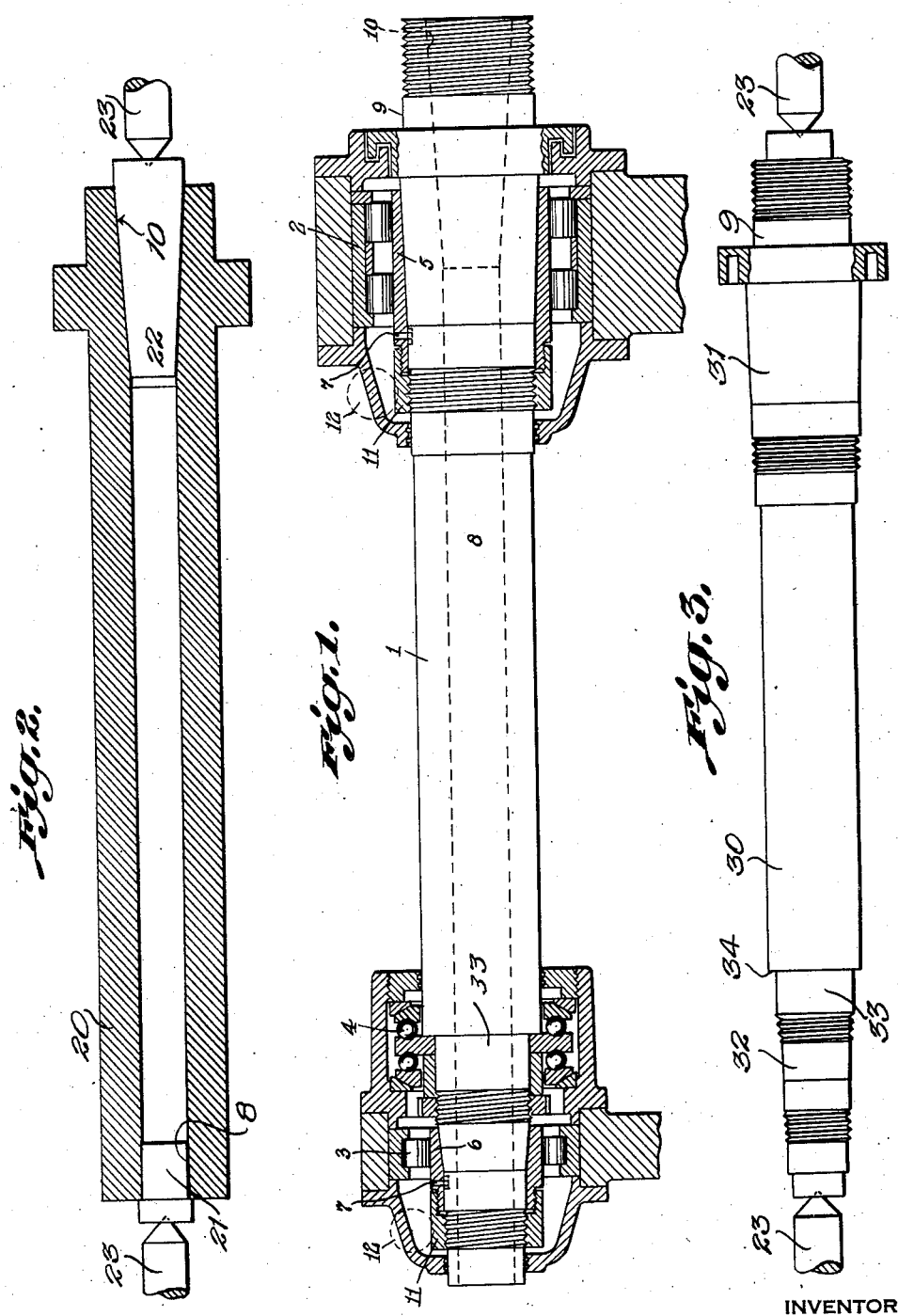

1,984,718

UNITED STATES PATENT OFFICE 1,984,718

METHOD OF ELIMINATING ECCENTRICITY IN THE ROTATION OF WORK SPINDLES FOR MACHINE TOOLS

Gunnar Wistrand, Schweinfurt, Germany, assignor to Aktiebolaget Svenska Kullagerfabriken, Gottenborg, Sweden, a corporation of Sweden Application April 12, 1933, Serial No. 665,670
In Germany May 20, 1932

6 Claims. (Cl. 29—148.4)

The present common practice in mounting the work spindles of machine tools is to mount two oppositely facing taper roller bearings at the work carrying end of the spindle. Other designs are, however, also used, as for instance the application of two preloaded ball bearings. In all such designs it is necessary to provide for an axial displacement of the inner or outer races of the bearings. In order to ensure the required true centric rotation of the spindle it is necessary with such designs to use anti-friction bearings which are either manufactured with special care or which have been picked out from a number of bearings having a minimum of eccentricity. These methods are very difficult to carry out and entail great expense.

The purpose of the present invention is to provide a method in which the above mentioned disadvantages are avoided. According to my method the rotating inner race is finish ground after being mounted on the rotating spindle. In this manner a true centric rotation of the spindle with reference to its geometrical axis, or with reference to the faces essential to a correct centering of the work or the tool, is obtained. It is then unnecessary when manufacturing the inner race to fix such narrow tolerance limits for the thickness of the inner races as hitherto, since irregularities in the thickness of the race and inaccuracies in the rotation of the spindle itself are compensated at the surface of the inner race by the finish grinding of the mounted race.

It is necessary that the anti-friction bearings used be of a type capable of being taken apart or, in other words, that the ball set or roller set can be removed from the inner race. The most suitable bearings for carrying out the method of the invention are those having a plain cylindrical inner race as, for example, in cylindrical roller bearings. Other bearing types, may, however, be used for carrying out the invention.

The radial slackness in the bearing can be most conveniently eliminated by expanding the inner race. The inner race is, therefore, provided with a tapering bore which engages a correspondingly tapering surface of the work spindle. In order to enable the inner race to be conveniently mounted the race should be fixed to the spindle by means of a nut. This nut is suitably formed so that, by turning it in one direction, the race will be forced onto the tapering part of the spindle while, by turning it in the other direction, it will be removed.

In the accompanying drawings, Figure 1 shows in elevation a work spindle for illustrating the method of applying my invention, the bearings and associated parts being shown in central longitudinal section.

Figure 2 illustrates in central longitudinal section the unfinished outside of the spindle. The inner reference surfaces are assumed to have been finished.

Figure 3 shows the outer surface of the spindle after this has been finished ground.

Figure 4 shows the inner rings of the bearings mounted on the shaft, and

Figure 5 shows the operation of completing the finished grinding of the bearing rings.

The outside unfinished spindle 20 as illustrated in Figure 2, the inner surfaces 9 and 10 having been finished, there are shown mounted on these the auxiliary mandrels 21 and 22, respectively. The surface 10 is preferably tapering and the mandrel 12 is tapering. The surface 9 is preferably the finished bore of the spindle and is cylindrical. Recesses are formed in the ends of these mandrels for receiving the centers 23—23.

In Figure 3 the spindle 30 is assumed to have been ground with faces to accommodate the various parts as, for instance, a taper face 31 to receive the bearing or bearing sleeve 5 of Figure 1, a taper face 32 to receive the bearing or bearing sleeve 6 of Figure 1, and a seat 33 and shoulder 34 for accommodating the thrust bearing in Figure 1. In Figure 4 there is shown mounted on the spindle 30 the inner rings 5 and 6 of the bearings which have taper bores to fit the taper seats 31—32. The nuts 11 are assumed to have forced these bearing sleeves 5 and 6 up on the taper seats 31 and 32 to their final positions in which final positions they are ground concentric with the axis upon which they and the spindle 30 are rotated upon the dead centers 23—23. In most instances the grinding wheels 35—36 will be so operated that they rotate this spindle and the bearings.

It is one of the purposes of my invention to grind the raceways of the rings 5 and 6 in position on the spindle upon which they are to be used as bearings. After the raceways of these rings are ground the ring is not removed from the spindle and great care is taken not to permit it to rotate on the spindle as this would, of course, immediately destroy the concentricity.

The work spindle 1 is shown mounted in radial bearings 2 and 3. Thrust is taken up by the thrust bearing 4. Both radial bearings 2 and 3 are cylindrical roller bearings having cylindrical inner races. The bearing 2 has two sets of rollers. The inner races 5 and 6 have tapering bores and are mounted on correspondingly tapered parts of the spindle 1. According to the invention the inner races 5 and 6 are finish ground after being fitted into place. Since the inner races are prevented from rotating relative to the spindle by means of pins 7, it follows that after the finish grinding the roller races are exactly centered with respect to the geometrical axis 8 of the spindle or with reference to the faces 9 and 10 essential to the centering of the work or tool. The groove of the rotating middle race of the thrust bearing can be finish ground in a similar manner, whereby all lateral movement of the spindle is eliminated.

The inner races 5 and 6 may be drawn or forced off with the aid of nuts 11 which are provided internally with oppositely directed threads engaging the races and the spindle respectively. By turning the nut, as for instance through a worm gear 12, it is possible to accurately adjust the internal play of the bearing.

Experience has shown that the outer races of the radial bearings must fit tightly in the housing in order to prevent vibration and to check all tendency of the race to creep. In the design described the outer race may be mounted with a drive fit without risking jamming due to inaccuracies in assembly and temperature differences. This risk cannot be avoided with previous designs having axially displaceable inner or outer races.

Having thus described my invention I claim and desire to secure by Letters Patent:

1. The method of eliminating eccentricity in the rotation of work spindles for machine tools mounted on anti-friction bearings, which consists in forming on the spindle tapering surfaces and supporting faces concentric to the geometrical axis thereof, then forming corresponding tapering bores in bearing race rings, then mounting the bores of such race rings on the tapering surfaces formed on the spindle, then supporting the spindle on the said supporting faces and rotating the same thereon, and then grinding the raceways of the bearings concentric to the said axis.

2. The art of truing work spindles which consists in forming adjacent to the respective ends of a spindle tapering surfaces, forming corresponding tapering bores in the race rings of radial anti-friction bearings, mounting the bores of such bearings upon such tapering spindle surfaces, rotating the spindle concentric to the axis of the tapering faces thereon, and then grinding the raceways of the bearings.

3. The art of truing work spindles which consists in forming adjacent to the respective ends of a spindle tapering surfaces, forming corresponding tapering bores in the race rings of radial anti-friction bearings, mounting the bores of such bearings upon such tapering spindle surfaces, rotating the spindle concentric to the axis of the tapering faces thereon, then grinding the raceways of the bearings and mounting the plate of an anti-friction thrust bearing on the spindle.

4. The art of truing work spindles which consists in forming adjacent to the respective ends of a spindle tapering surfaces, forming corresponding tapering bores in the race rings of radial anti-friction bearings, mounting the bores of such bearings upon such tapering spindle surfaces, mounting the plate of an anti-friction thrust bearing on the spindle, then rotating the spindle concentric to the axis of the taper faces thereon and then simultaneously grinding the raceways of the bearings to make them truly concentric and the thrust plate perpendicular to the axis of the spindle.

5. The method of eliminating eccentricity in the rotation of work spindles for machine tools mounted on anti-friction bearings, which consists in forming on the spindle supporting faces concentric to its geometrical axis, then mounting on the spindle the inner race ring of one or more anti-friction bearings, then supporting and rotating the spindle upon such faces, and then grinding the raceways of the bearings concentric to the said axis, then assembling the rollers and the outer race rings on said bearings and then taking up internal slackness in the bearings by forcing the inner rings up on their taper seats.

6. The method of eliminating eccentricity in the rotation of work spindles for machine tools mounted on anti-friction bearings, which consists in forming on the spindle tapering surfaces and supporting faces concentric to the geometrical axis thereof, then forming corresponding tapering bores in bearing race rings, then mounting the bores of such race rings on the tapering surfaces formed on the spindle, then supporting the spindle on the said supporting faces and rotating the same thereon, and then grinding the raceways of the bearings concentric to the said axis, then assembling the rollers and the outer race rings on said bearings and then taking up internal slackness in the bearings by forcing the inner rings up on their taper seats.

GUNNAR WISTRAND.